Figure 1:
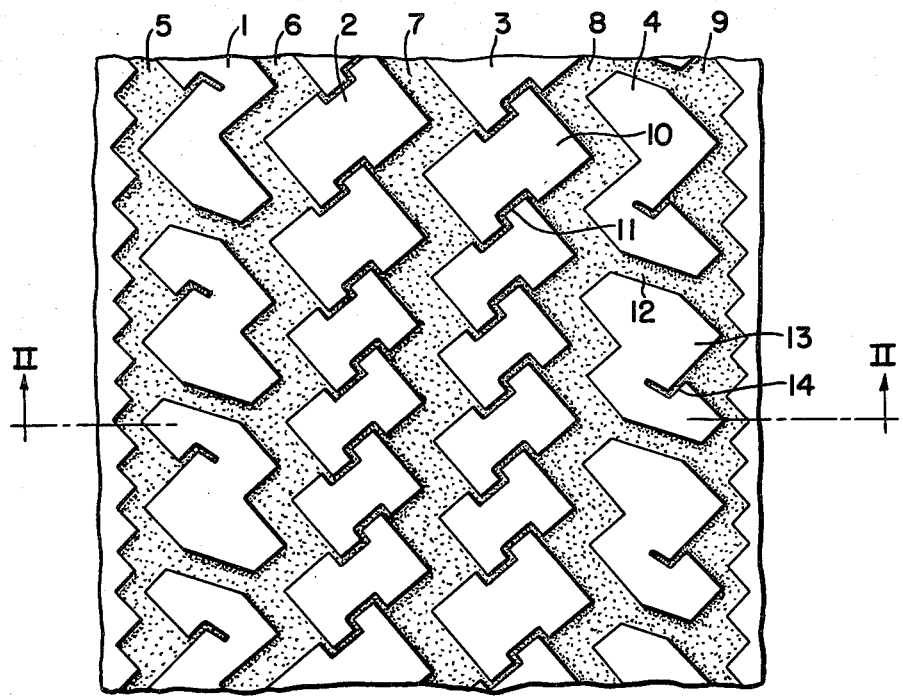

United States Patent [19]

Kuhn et al.

[11] Patent Number: 4,471,825
[45] Date of Patent: Sep. 18, 1984

[54] TREAD STRUCTURE FOR PNEUMATIC VEHICLE TIRE

[75] Inventors: Dieter Kuhn, Burgwedel; Udo Frerichs; Henner Pieper, both of Langenhagen; Heinz-Dieter Rach, Garbsen, all of Fed. Rep. of Germany

[73] Assignee: Continental Gummi-Werke Aktiengesellschaft, Hanover, Fed. Rep. of Germany

[21] Appl. No.: 411,680

[22] Filed: Aug. 26, 1982

[30] Foreign Application Priority Data

Sep. 4, 1981 [DE] Fed. Rep. of Germany ... 8125725[U]

[51] Int. Cl.³ .............................................. B60C 11/06
[52] U.S. Cl. ................................. 152/209 R; D12/143
[58] Field of Search ........... 152/209 R, 209 A, 209 B, 152/209 NT, 209 WT, 209 D; D12/137, 140, 142, 143, 146, 147

[56] References Cited

U.S. PATENT DOCUMENTS

| D. 239,102 | 3/1976 | Martinet | D12/146 |
| D. 239,167 | 3/1976 | Martinet | D12/146 |
| D. 239,765 | 5/1976 | Yahagi et al. | D12/147 |
| D. 245,327 | 8/1977 | Bennett | D12/146 |
| D. 261,495 | 10/1981 | Yurkovich | D12/146 |
| D. 266,835 | 11/1982 | Candilotis | D12/147 |
| 3,199,567 | 8/1965 | Kunz et al. | 152/209 R |

FOREIGN PATENT DOCUMENTS

| 1605637 | 1/1970 | Fed. Rep. of Germany ... 152/209 D |
| 2948479 | 6/1981 | Fed. Rep. of Germany ... 152/209 D |

Primary Examiner—Edward C. Kimlin
Assistant Examiner—F. K. Wine
Attorney, Agent, or Firm—Becker & Becker, Inc.

[57] ABSTRACT

A tread structure for pneumatic tires, especially for motor vehicles, having two circumferential ribs which include essentially rectangular blocks; these blocks are arranged sequentially one after the other in the circumferential direction of the tire, and are separated from each other by S-shaped fine slits. Several circumferential main grooves extend in a zig-zag manner in such a way as to form angles of 90°. Respective separating grooves separate the tread from the sidewalls of the tire. Three main grooves are provided which enclose the two circumferential ribs of essentially rectangular blocks. The central main groove is located in the zenith portion of the tire; the outer main grooves are respectively connected with the adjacent separating grooves by transverse grooves which are disposed at a slight incline to the transverse direction. The tread profile depth is at most 5 mm.

4 Claims, 2 Drawing Figures

TREAD STRUCTURE FOR PNEUMATIC VEHICLE TIRE

The present invention relates to a tread structure for pneumatic tires, especially for motor vehicles, and has two peripheral of circumferential ribs which comprise essentially rectangular blocks; these blocks are arranged sequentially one after the other in the circumferential direction of the tire, and are separated from each other by S-shaped fine slits; several circumferential main grooves extend in a zig-zag manner in such a way as to form angles of 90°; respective separating grooves separate the tread from the sidewall zones of the tire.

In connection with the energy shortage and the increase in the cost of energy, spare tires for motor vehicles have already been proposed that are distinguished by being space saving and light weight. These known tires, which are constructed in part to produce a noise level as high as possible, frequently have a profiling which is not optimally selected with respect to important ride conditions.

It is therefore an object of the present invention to provide a tread structure for spare tires having improved riding characteristics.

Figure 2:
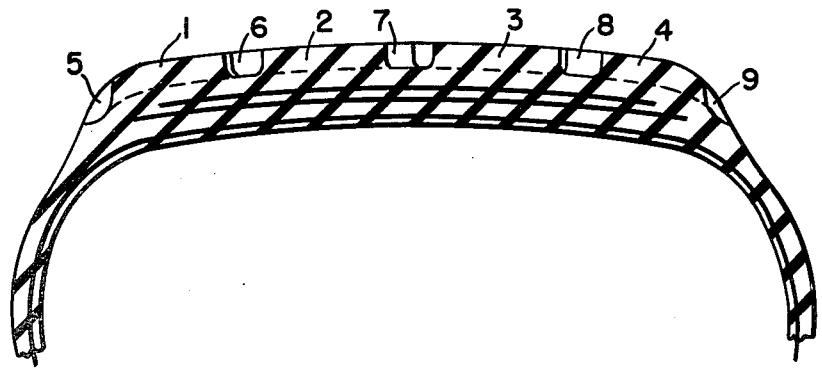

This object, and other objects and advantages of the present invention, will appear more clearly from the following specification in connection with the accompanying drawing, in which:

FIG. 1 is a plan view of one embodiment of the inventive tread of a pneumatic vehicle tire; and FIG. 2 is a radial cross-sectional view through the tire of FIG. 1.

The tread structure of the present invention is characterized primarily by providing three main grooves which enclose the two circumferential ribs of essentially rectangular blocks; the central main groove is located in, or coincides with, the zenith portion of the tire; the outer main grooves are respectively connected with the adjacent separating grooves via transverse grooves which are disposed at a slight incline to the transverse direction; the depth of the blocks is at most 5 mm.

The tread structure according to the present invention, due to the grooves and ribs which extend in the circumferential direction, provides the tire with a high level of quietness during movement, and with a reliable grooving.

Good properties under wet conditions, especially with respect to hydroplaning, are further advantages which are attained by the three main grooves, and especially by the transverse grooves, which drain off the water to the side, and which are disposed in the shoulder region at a slight incline with respect to the transverse direction.

The two middle circumferential ribs take over the traction function, with the essentially rectangular blocks, due to the serration or toothing formed by the S-shaped fine slits, being adapted to receive particularly high transverse forces.

The Z-shaped lugs arranged in the two lateral circumferential ribs in an especially advantageous manner effect an equalization or balancing of the slippage which can occur on the ground contact zone.

The tread structure according to the present invention, due to the small groove depth, is adapted not only for tires with radial support, but also for tires with diagonal support.

According to advantageous specific embodiments of the present invention, the main axis of the blocks and of the S-shaped fine slits may form an angle of 30° to 45° with respect to the transverse direction.

A further circumferential rib may respectively extend between each outer main groove and each separating groove; these further circumferential ribs may be formed by successive, approximately Z-shaped lugs which have a large support surface. Viewed in the circumferential direction, the Z-shaped lugs may extend approximately over a distance corresponding to that covered by two sequential blocks.

The Z-shaped lugs, at least in their central region, may have fine slits which are connected with the separating grooves. The tread profile depth may be 4 mm.

Referring now to the drawing in detail, the structure of the tread includes four circumferential or peripheral ribs 1, 2, 3, 4, and five circumferential or peripheral grooves 5,6,7,8,9 which extend in a zig-zag manner in such a way as to form angles of 90°.

The three inwardly located main grooves 6, 7 and 8, of which the middle groove 7 coincides with the zenith portion of the tire, enclose the two circumferential ribs 2 and 3, which comprise essentially rectangular blocks 10; these blocks 10 are arranged sequentially one after the other in the circumferential direction of the tire, and are separated from each other by S-shaped fine slits 11. The S-shaped fine slits 11 furthermore effect an inner serration or toothing of the blocks 10.

The main axis of the S-shaped fine slits 11, as well as the main axis of the essentially rectangular blocks 10, preferably extends at an angle of 30° to 45° to the transverse direction. The sequential blocks 10 can have different surface areas. Furthermore, the blocks 10 of the circumferential rib 2 can be offset or displaced differently from the corresponding blocks 10 of the circumferential rib 3.

The two outwardly located grooves 5,9 serve as separating grooves which separate the tread and the sidewall zones of the tire, thereby increasing the riding comfort. These outer grooves 5, 9 at the same time can be constructed as design grooves.

The two outer main grooves 6 and 8 are connected by transverse grooves 12 with the separating groove 5,9 respectively adjacent thereto; these transverse grooves 12 are disposed at a slight incline to the transverse direction. The transverse grooves 12 primarily serve to drain water off to the side.

A circumferential rib 1, 4 respectively extends between each outer main groove 6,8 and each separating groove 5,9; each peripheral rib 1, 4 is formed by successive, approximately Z-shaped lugs 13 which have a relatively large support surface. The individual lugs 13 are separated from one another by the transverse grooves 12. The lugs 13 have fine slits 14 on that side which faces the separating grooves 5,9; the fine slits 14 are located approximately in the central region of the lugs 13. In the circumferential direction, the lugs 13 extend approximately over a distance corresponding to that covered by two sequential blocks 10.

The present invention is, of course, in no way restricted to the specific disclosure of the specification and drawing, but also encompasses any modifications withing the scope of the appended claims.

What is claimed is:

1. A tread structure for a pneumatic tire which has sidewalls as well as the tread structure having a circumferential direction and a transverse direction therewith having components thereof arranged to maintain balance for an advantageous steering, controll or guiding behavior and also for good traction characterisitics, said tread structure comprising in combination;

two circumferentially extending first ribs, each of which comprises essentially rectangular blocks, said blocks of a given one of said first ribs, when viewed in the circumferential direction of said tire being arranged sequentially and being separated from one another by S-shaped fine slits there also being a main axis of said blocks and of said S-shaped fine slits forming an angle of from 30° to 45° with respect to transverse direction of said tire;

three main grooves including a central, circumferentially extending main groove disposed between said two first ribs and coinciding with the zenith portion of said tire;

said three main grooves also including two outer, circumferentially extending main grooves, one on each side of a first rib and remote from said central main groove; each of said central main groove and said two outer main grooves extending in a zig-zag manner in such a way as to form right angles of 90°;

additionally two circumferentially extending separating grooves, one on that side of each outer main groove remote from said central main groove for separating said first ribs from an adjacent sidewall of said tire; two circumferentially extending second ribs, one disposed between each adjacent pair of second outer main grooves and said separating grooves; each of said second ribs, when viewed in the circumferential direction of said tire, comprising successive, approximately Z-shaped lugs which have a large support surface; and transverse grooves disposed at a slight angle with respect to the transverse direction of said tire, said transverse grooves also connecting a given one of said two outer main grooves with the adjacent one of said two separating grooves respectively; with the depth of all five of said circumferentially extending grooves being at most 5 mm.

2. A tread structure in combination according to claim 1, in which, when viewed in the circumferential direction of said tire, said Z-shaped lugs extend approximately over a distance which corresponds to the distance covered by two sequential blocks of a given one of said first ribs.

3. A tread structure in combination according to claim 1, in which each of said Z-shaped lugs has at least one fine slit, said fine slits being located at least in the central region of a given lug, and being connected with the adjacent separating groove.

4. A tread structure in combination to claim 1, in which the depth of said groove is 4 mm.

* * * * *